United States Patent
Furusho et al.

(10) Patent No.: US 11,905,838 B2
(45) Date of Patent: Feb. 20, 2024

(54) SEAL MEMBER AND ROTARY MACHINE

(71) Applicant: MITSUBISHI HEAVY INDUSTRIES, LTD., Tokyo (JP)

(72) Inventors: Tatsuro Furusho, Kanagawa (JP); Shin Nishimoto, Kanagawa (JP); Hidekazu Uehara, Tokyo (JP); Kohei Ozaki, Tokyo (JP); Azumi Yoshida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/628,636

(22) PCT Filed: Jul. 16, 2020

(86) PCT No.: PCT/JP2020/027637
§ 371 (c)(1),
(2) Date: Jan. 20, 2022

(87) PCT Pub. No.: WO2021/015081
PCT Pub. Date: Jan. 28, 2021

(65) Prior Publication Data
US 2022/0259982 A1   Aug. 18, 2022

(30) Foreign Application Priority Data
Jul. 23, 2019 (JP) .................................. 2019-135498

(51) Int. Cl.
*F01D 11/08* (2006.01)
*F02C 7/28* (2006.01)

(52) U.S. Cl.
CPC ................ *F01D 11/08* (2013.01); *F02C 7/28* (2013.01)

(58) Field of Classification Search
CPC .. F01D 11/02; F01D 11/08; F02C 7/28; F05D 2240/55; Y02E 20/16
See application file for complete search history.

(56) References Cited

U.S. PATENT DOCUMENTS 4,370,094 A * 1/1983 Ambrosch ........... F16J 15/4472
415/173.6
4,420,161 A * 12/1983 Miller .................... F01D 25/04
415/230

(Continued)

FOREIGN PATENT DOCUMENTS

CN     106703900 A    5/2017
DE     69625694 T2    8/2003

(Continued)

OTHER PUBLICATIONS

Written Opinion dated Sep. 24, 2020, issued in counterpart Application No. PCT/JP2020/027637, with English translation. (10 pages).

(Continued)

*Primary Examiner* — Igor Kershteyn
(74) *Attorney, Agent, or Firm* — WHDA, LLP (57) ABSTRACT

A seal member is disposed between a rotor and a stator to provide a seal between the rotor and the stator. The seal member comprises: a rotary-side member fixed to a surface of the rotor opposing the stator; a fixed-side member fixed to the stator and facing the rotary-side member; and a first fin and a second fin which are disposed on one of the rotary-side member and the fixed-side member, the first fin protruding on the opposing surface side, the second fin being disposed on a lower pressure side in a rotating axis direction relative to the first fin and protruding on the opposing surface side. The thickness, in the rotating axis direction, of the second fin at the root thereof is greater than the thickness, in the rotating axis direction, of the first fin at the root thereof.

9 Claims, 9 Drawing Sheets

(56) References Cited

U.S. PATENT DOCUMENTS

| | | |
|---|---|---|
| 5,599,026 A | 2/1997 | Sanders et al. |
| 5,704,614 A | 1/1998 | Sanders et al. |
| 2012/0003080 A1 | 1/2012 | Deo et al. |
| 2012/0043728 A1* | 2/2012 | Zeng ................. F01D 11/02 277/412 |
| 2012/0321449 A1* | 12/2012 | Matsumoto ............ F01D 11/02 415/173.6 |
| 2014/0020403 A1* | 1/2014 | Tsukuda ................ F01D 11/02 415/110 |
| 2014/0119901 A1* | 5/2014 | Shibata ................. F01D 9/041 415/173.1 |
| 2014/0232070 A1* | 8/2014 | Takigahira ........... F16J 15/3404 277/408 |
| 2014/0286599 A1* | 9/2014 | Devitt .................... H01R 39/20 384/100 |
| 2015/0001812 A1 | 1/2015 | Stefanis et al. |
| 2017/0022838 A1 | 1/2017 | Kuwamura et al. |
| 2019/0178292 A1 | 6/2019 | Iizuka et al. |

FOREIGN PATENT DOCUMENTS

| | | |
|---|---|---|
| JP | S58-46265 A | 3/1983 |
| JP | H11-13409 A | 1/1999 |
| JP | 2012-13083 A | 1/2012 |
| JP | 2015-511677 A | 4/2015 |
| WO | 2015/083588 A1 | 6/2015 |
| WO | 2018/012540 A1 | 1/2018 |

OTHER PUBLICATIONS

Office Action dated Sep. 14, 2023, issued in counterpart German application No. 112020003007.5, with English translation. (19 pages).

* cited by examiner

SEAL MEMBER AND ROTARY MACHINE

TECHNICAL FIELD

The present invention relates to a seal member and a rotary machine.

BACKGROUND ART

A rotary machine such as a steam turbine and a gas turbine is configured as follows. A rotor is supported by a bearing to be rotatable inside a stator. While rotor blades in a plurality of stages are fixed to the rotor, stator blades in a plurality of stages are fixed to the stator. Then, a fluid is supplied from a supply port of the stator, and passes through the plurality of rotor blades and the plurality of stator blades. In this manner, the rotor is rotationally driven via each of the rotor blades, and the fluid is discharged outward from a discharge port.

In the gas turbine configured in this way, a seal member is provided between the stator and the rotor in order to prevent a leakage of the fluid in an axial direction between the stator and the rotor. Then, in some cases, a labyrinth seal may be applied as the seal member. For example, PTL 1 discloses a configuration in which a plurality of seal fins are provided on an inner surface of the stator or an outer surface of the rotor as the labyrinth seal. As the seal fin, PTL 1 discloses a cut seal fin formed by being cut from a base material and an attachment type seal fin attached to the base material later by being formed of a member separate from the base material.

CITATION LIST

Patent Literature

[PTL 1] Japanese Unexamined Patent Application Publication No. 11-13409

SUMMARY OF INVENTION

Technical Problem

Here, the seal fin needs to improve both performance of leakage prevention of the fluid and strength against an external force caused by a front-rear differential pressure of a turbine, for example. That is, in a seal member of the rotary machine, while a leakage of the fluid is prevented, it is necessary to prevent a decrease in the strength.

The present invention is made to solve the above-described problems, and an object thereof is to provide a seal member and a rotary machine which prevent a decrease in strength while a leakage of a fluid is prevented.

Solution to Problem

In order to solve the above-described problems and to achieve the object, there is provided a seal member disposed between a rotor and a stator to seal a portion between the rotor and the stator. The seal member includes a rotary-side member fixed to a facing surface of the rotor which faces the stator, a fixed-side member fixed to the stator to face the rotary-side member, a first fin provided in any one of the rotary-side member and the fixed-side member and protruding to a facing surface side, and a second fin disposed on a low-pressure side in a rotation axis direction from the first fin, and protruding to the facing surface side. A thickness of the second fin at a root in the rotation axis direction is thicker than a thickness of the first fin at a root in the rotation axis direction.

In the seal member, the second fin having a wide width is provided on the low-pressure side from the first fin. Accordingly, while a leakage of a fluid is prevented, it is possible to prevent a decrease in strength.

It is preferable that a tip thickness of the second fin in the rotation axis direction is thicker than a tip thickness of the first fin in the rotation axis direction. In the seal member, the second fin having a wide width is provided on the low-pressure side from the first fin. Accordingly, while a leakage of a fluid is prevented, it is possible to prevent a decrease in strength.

It is preferable that the second fin is formed of a material having higher strength than that of the first fin. The second fin is formed of a material having higher strength than that of the first fin. Accordingly, it is possible to more properly improve the strength of the fin at a location where a differential pressure is high.

It is preferable that the first fin is an attachment type fin separate from an installed member, and that the second fin is a fixed type fin integrated with the installed member. According to the seal member, while the leakage of the fluid is prevented, it is possible to prevent the decrease in the strength.

It is preferable that in the rotation axis direction, the second fin is disposed on a low-pressure side from a central position in the rotation axis direction of the rotary-side member or the fixed-side member. According to the seal member, the second fin is disposed on the low-pressure side from the center. Accordingly, while the second fin reinforces the location where the differential pressure is high, the first fin can properly prevent the leakage of the fluid.

It is preferable that in the rotation axis direction, the second fin is disposed on a low-pressure side from all of the first fins. According to the seal member, while the second fin reinforces the location where the differential pressure is high, the first fin can properly prevent the leakage of the fluid.

It is preferable that the seal member further includes at least one auxiliary fixed-side member fixed to the stator to be aligned with the fixed-side member, and provided with a fin protruding to the facing surface side, and an auxiliary rotary-side member fixed to the rotor at a position facing the auxiliary fixed-side member, and provided with a fin protruding to the facing surface side. According to the seal member, while the leakage of the fluid is prevented, it is possible to prevent the decrease in the strength.

It is preferable that the auxiliary fixed-side member is disposed on a high-pressure side in the rotation axis direction from the fixed-side member. According to the seal member, while the leakage of the fluid is prevented, it is possible to prevent the decrease in the strength.

It is preferable that any one of the rotary-side member and the fixed-side member further has a protrusion portion having a protrusion amount smaller than that of the first fin and the second fin.

In order to solve the above-described problems and to achieve the object, a rotary machine according to the present disclosure includes the seal member, a rotor, and a stator. According to the rotary machine, while the leakage of the fluid is prevented, it is possible to prevent the decrease in the strength.

Advantageous Effects of Invention

According to the present invention, while the leakage of the fluid is prevented, it is possible to prevent the decrease in the strength.

DESCRIPTION OF EMBODIMENTS

Hereinafter, preferred embodiments of the present invention will be described in detail with reference to the accompanying drawings. The present invention is not limited by the embodiments. In a case where there are a plurality of the embodiments, the present invention also includes a configuration adopted by combining the respective embodiments with each other.

Figure 1:
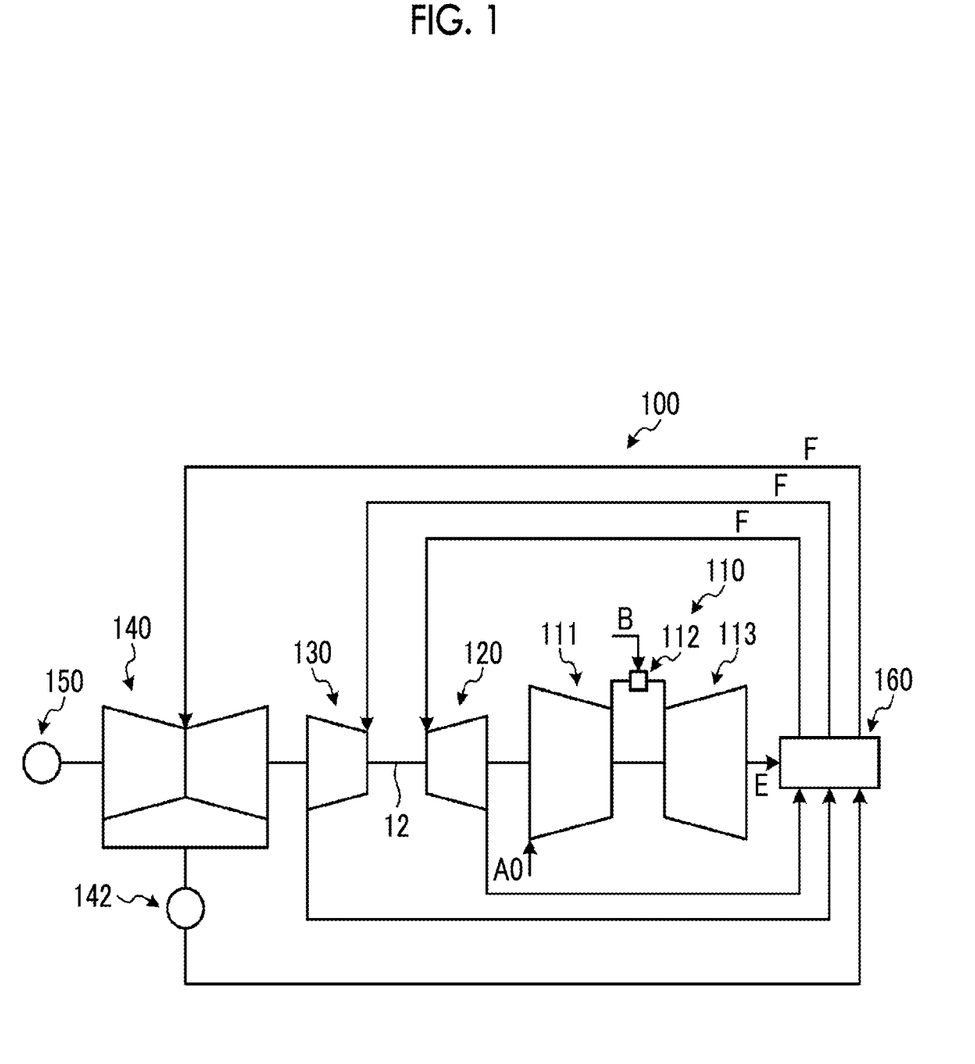
FIG. 1 is a schematic configuration diagram illustrating a combined cycle plant according to the present embodiment.

FIG. 1 is a schematic configuration diagram illustrating a combined cycle plant according to the present embodiment. As illustrated in FIG. 1, a combined cycle plant 100 according to the present embodiment is configured to include a gas turbine 110, a high-pressure steam turbine 120, a medium-pressure steam turbine 130, and a low-pressure steam turbine 140. The gas turbine 110, the high-pressure steam turbine 120, the medium-pressure steam turbine 130, and the low-pressure steam turbine 140 are disposed coaxially with a generator 150.

The gas turbine 110 is configured to include a compressor 111, a combustor 112, and a turbine 113. In the compressor 111, a pressure of air A0 is raised, and the air A0 is supplied to the combustor 112. In the combustor 112, high-temperature combustion gas is generated by the supplied air A0 and a fuel B, and is supplied to the turbine 113. The combustion gas passing through the turbine 113 is discharged as exhaust gas E after the turbine 113 is rotationally driven.

The combined cycle plant 100 includes a boiler (heat recovery steam generator) 160. The boiler 160 uses the exhaust gas E discharged from the turbine 113 in the gas turbine 110 as a heating source, thereby generating a fluid F which is superheated steam from water. The superheated steam (fluid F) generated by the boiler 160 drives the high-pressure steam turbine 120, the medium-pressure steam turbine 130, and the low-pressure steam turbine 140. Then, the generator 150 generates power by driving the gas turbine 110, the high-pressure steam turbine 120, the medium-pressure steam turbine 130, and the low-pressure steam turbine 140. In addition, the steam used in the low-pressure steam turbine 140 is condensed by a condenser 142 connected to the low-pressure steam turbine 140, and is sent to the boiler 160 as the water for generating the superheated steam. In an example in FIG. 1, the gas turbine 110 and the steam turbine (high-pressure steam turbine 120, medium-pressure steam turbine 130, and low-pressure steam turbine 140) are coaxially connected. However, a configuration is not limited to the coaxial connection. For example, the gas turbine 110 and the steam turbine may have separate axes, and the generator 150 may be connected to each of the gas turbine 110 and the steam turbine.

A rotary machine such as the gas turbine 110 or the steam turbine (high-pressure steam turbine 120, medium-pressure steam turbine 130, and low-pressure steam turbine 140) applied to the combined cycle plant 100 in this way has a rotor and a stator. A seal member 30 according to the present embodiment is disposed between the rotor and the stator, and seals a portion between the stator and the rotor. However, the seal member 30 does not completely seal the portion between the stator and the rotor, and maintains a predetermined clearance between the stator and the rotor.

Figure 2:
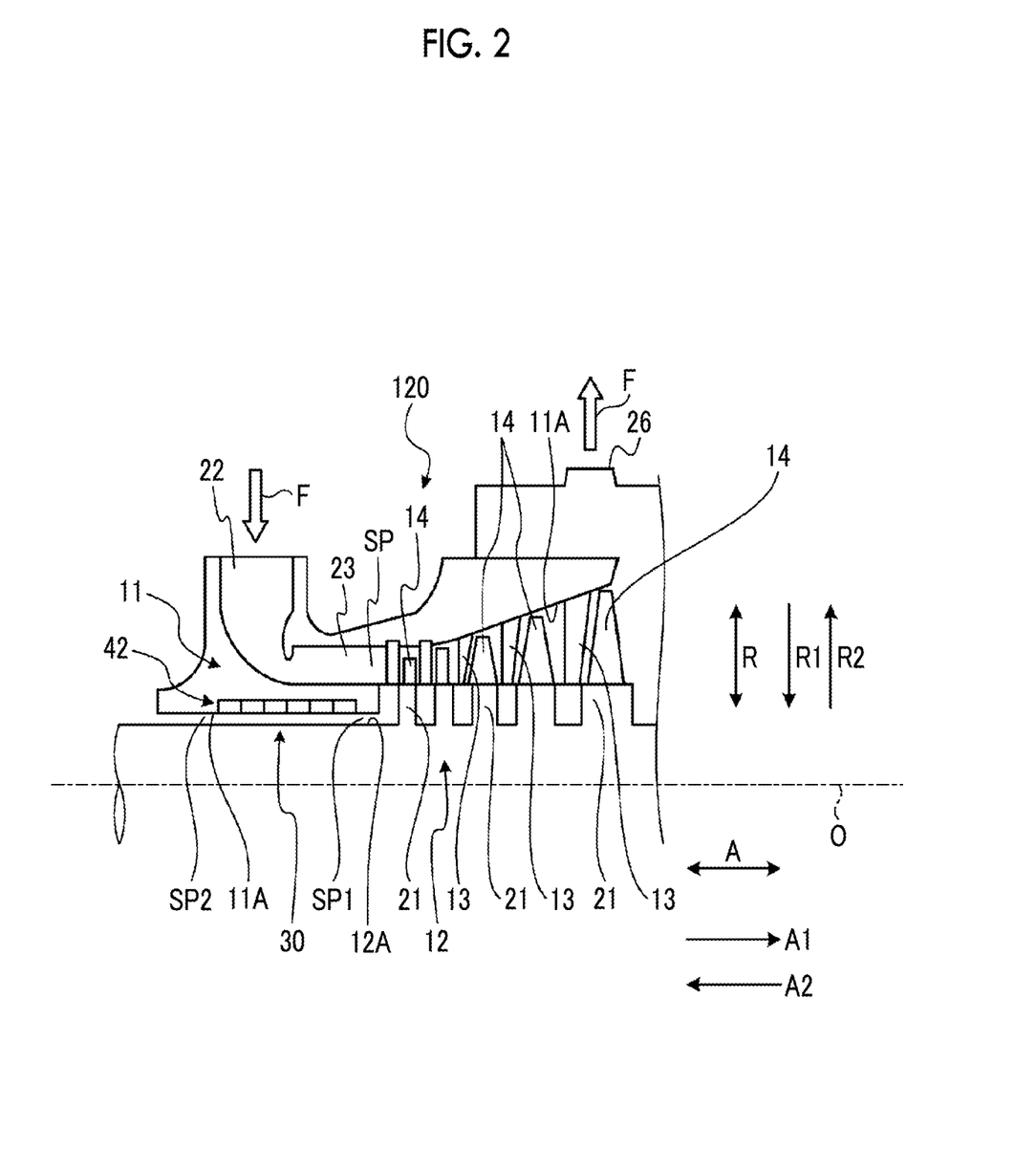
FIG. 2 is a schematic view of a turbine according to the present embodiment.

In the present embodiment, the seal member 30 is provided between the high-pressure steam turbine 120 and the medium-pressure steam turbine 130. FIG. 2 is a schematic view for describing a position of the seal member according to the present embodiment. As illustrated in FIG. 2, the high-pressure steam turbine 120 includes a stator 11, a rotor 12, a stator blade 13, a rotor blade 14, and the seal member 30. The stator 11 is a hollow member internally having a space SP. The rotor 12 is a shaft-shaped member, and is provided inside the space SP of the stator 11. An inner peripheral surface 11A of the stator 11 and an outer peripheral surface 12A of the rotor 12 face each other. When an axial direction of the rotor 12 is defined as a rotation axis direction A, the rotor 12 rotates around a central axis O along the rotation axis direction A as a rotation axis. Hereinafter, a direction on one side in a direction parallel to the rotation axis direction A will be referred to as a direction A1, and a direction on the other side in the direction parallel to the rotation axis direction A, that is, a direction opposite to the direction A1, will be referred to as a direction A2. In addition, a radial direction when the rotation axis direction A is the rotation axis will be referred to as a radial direction R. Then, a radially inward direction when the rotation axis direction A is the rotation axis, that is, a direction toward the rotor 12, will be referred to as a direction R1, and a radially outward direction when the rotation axis direction A is the rotation axis, that is, a direction away from the rotor 12, will be referred to as a direction R2.

The stator 11 has a fluid inlet 22 and a fluid outlet 26 which communicate with the space SP inside the stator 11. The fluid F which is superheated steam supplied from the boiler 160 is introduced into the space SP from the fluid inlet 22. The fluid F passing between the stator blade 13 and the rotor blade 14 inside the space SP is guided outward of the space SP from the fluid outlet 26.

The stator blade 13 is provided on the inner peripheral surface 11A in the space SP of the stator 11, and is fixed to the stator 11. The stator blade 13 protrudes from the inner peripheral surface 11A of the stator 11 to a side in the direction R1, that is, to the rotor 12 side. A plurality of the stator blades 13 are provided at a predetermined interval along a rotation direction (circumferential direction) of the rotor 12, and the plurality of stator blades 13 are provided along the rotation axis direction A.

The rotor blade 14 is fixed to the rotor 12 via a rotor disk 21 in the space SP. The rotor disk 21 is provided on the outer peripheral surface 12A of the rotor 12 in the space SP, and is fixed to the rotor 12. The rotor blade 14 is fixed to an outer peripheral portion of the rotor disk 21, and protrudes from the outer peripheral portion of the rotor disk 21 to a side in the direction R2, that is, to the stator 11 side. A plurality of the rotor blades 14 are provided at a predetermined interval along the rotation direction (circumferential direction) of the rotor 12, and the plurality of rotor blades 14 are provided along the rotation axis direction A. The rotor blades 14 and the stator blades 13 are alternately provided along the rotation axis direction A.

The seal member 30 is provided on a side in the direction A2 from the space SP in which the stator blade 13 and the rotor blade 14 are provided. Specifically, the seal member 30 is provided between a space SP1 and a space SP2. The space SP1 is a space on a side in the direction A1 of the seal member 30, and the space SP2 is a space on a side in the direction A1 of the seal member 30. The space SP2 has a lower pressure than the space SP1. Accordingly, the fluid F flows from the space SP1 side to the space SP2 side. In the present embodiment, the space SP1 communicates with the space SP, and the space SP2 is open to the atmosphere, for example.

Figure 3:
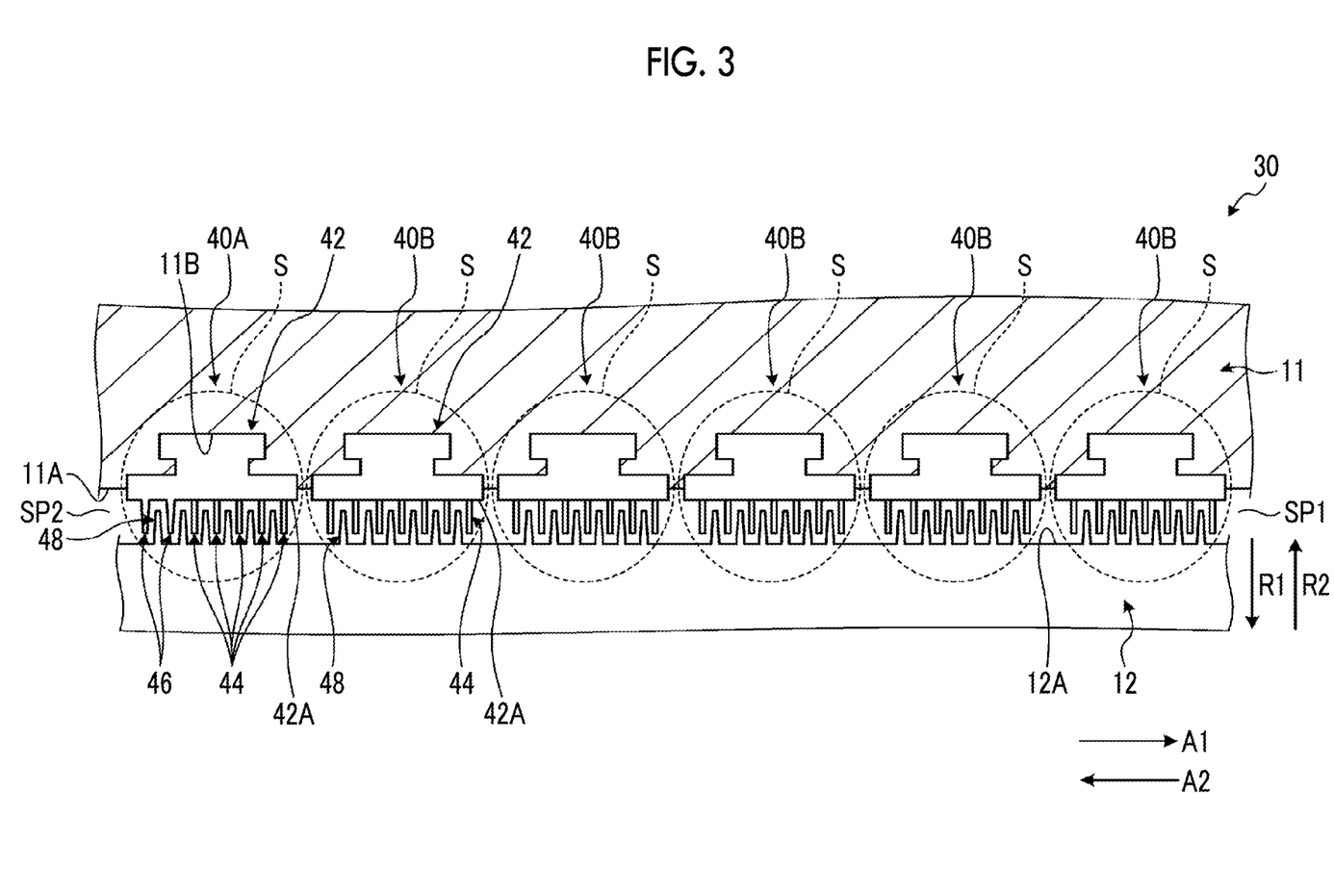
FIG. 3 is a schematic view illustrating a seal member according to the present embodiment.

FIG. 3 is a schematic view illustrating the seal member according to the present embodiment. As illustrated in FIG. 3, a plurality of seal rings 42 aligned in the rotation axis direction A are provided between the space SP1 and the space SP2 in which the seal member 30 is provided. The seal ring 42 is fixed to the inner peripheral surface 11A of the stator 11 between the space SP1 and the space SP2. The seal ring 42 and a portion of the rotor 12 which faces the seal ring 42 in the radial direction R configure one segment S. The segment S is aligned in the rotation axis direction A between the space SP1 and the space SP2.

The seal member 30 includes a first seal portion 40A and a second seal portion 40B. The first seal portion 40A and the second seal portion 40B are aligned in the rotation axis direction A. In the present embodiment, the first seal portion 40A is located on a side (low-pressure side) in the direction A2 from the second seal portion 40B between the space SP1 and the space SP2. More specifically, in the seal member 30, the first seal portion 40A is located closest to the side in the direction A2, and a plurality of the second seal portions 40B are aligned on a side in the direction A1 of the first seal portion 40A. In other words, the first seal portion 40A and the second seal portion 40B are respectively provided in the segment S. That is, one first seal portion 40A or one second seal portion 40B is provided for one segment S. The first seal portion 40A is provided in the segment S closest to the side in the direction A2 between the space SP1 and the space SP2, and the second seal portion 40B is provided in the segment S on the side in the direction A1 from the segment S in which the first seal portion 40A is provided. In the present embodiment, a plurality of the segments S are provided on the side in the direction A1 from the segment S closest to the side in the direction A2, and the second seal portions 40B are respectively provided in the plurality of segments S. However, an aligning order of the first seal portion 40A and the second seal portion 40B is not limited thereto. For example, the second seal portion 40B may be provided on the side in the direction A1 and the direction A2 of the first seal portion 40A, or the first seal portion 40A may be provided closest to the side in the direction A1. In addition, in the present embodiment, one first seal portion 40A is provided, and the plurality of second seal portions 40B are provided. However, the number is not limited thereto, and a plurality of the first seal portions 40A may be provided. Furthermore, the first seal portion 40A may be provided, and the second seal portion 40B may not be provided.

Another example of a preferable position where the first seal portion 40A is provided will be described. For example, it is preferable that the first seal portion 40A is provided in the segment S having a minimum clearance out of the plurality of segments S between the space SP1 and the space SP2. The clearance here indicates a clearance between the rotor and the stator, and in the present embodiment, the clearance is a distance between a tip surface of the fin protruding from the seal ring 42 and the outer peripheral surface 12A of the rotor 12. For example, the fin protruding from the seal ring 42 indicates a first fin 44, a second fin 46, and a third fin 48 (to be described later), and the clearance indicates clearances L1, L2, and L3 (to be described later). In addition, for example, it is preferable that the first seal portion 40A is provided in the segment S to which active clearance control (ACC) is applied. The ACC indicates a mechanism that adjusts a clearance of a turbine when the turbine is actuated. In the segment S to which the ACC is applied, for example, the seal ring 42 is configured to be movable in the radial direction R by applying an external force. In the segment S to which the ACC is applied, for example, the seal ring 42 is moved in the radial direction R by supplying compressed air and applying the external force such as a differential pressure to the seal ring 42. In this manner, the clearance is adjusted. In the examples, the second seal portion 40B is also provided in the segment S other than the segment S in which the first seal portion 40A is provided.

Next, a detailed configuration of the first seal portion 40A will be described. The first seal portion 40A includes the segment S (the seal ring 42 and a portion of the rotor 12 which faces the seal ring 42 in the radial direction R), the first fin 44, the second fin 46, and the third fin 48. The seal ring 42 of the segment S is fixed to the inner peripheral surface 11A of the stator 11 by being inserted into a groove 11B formed on the inner peripheral surface 11A of the stator 11. In the seal ring 42, a tip surface 42A on the side in the direction R1 is exposed (here, protruding) from the inner peripheral surface 11A of the stator 11 to the side in the direction R1. In the segment S, the tip surface 42A of the seal ring 42 and the outer peripheral surface 12A of the rotor 12 face each other with a predetermined clearance in the radial direction R. That is, in the present embodiment, in the segment S in which the first seal portion 40A is provided, the portion of the rotor 12 which faces the seal ring 42 in the radial direction R is a rotary-side member fixed to the outer peripheral surface 12A (facing surface facing the stator 11) of the rotor 12, and the seal ring 42 is a fixed-side member fixed to the stator 11 and facing the rotor 12 (rotary-side member). However, for example, the rotary-side member separate from the rotor 12 may be fixed to the outer peripheral surface 12A of the rotor 12, and the rotary-side member and the seal ring 42 may configure the segment S.

The first fin 44 and the second fin 46 are fixed to one surface of the seal ring 42 and the rotor 12 which face each other. In the present embodiment, the first fin 44 and the second fin 46 are provided on the tip surface 42A of the seal ring 42, and are fixed to the tip surface 42A.

Figure 4:
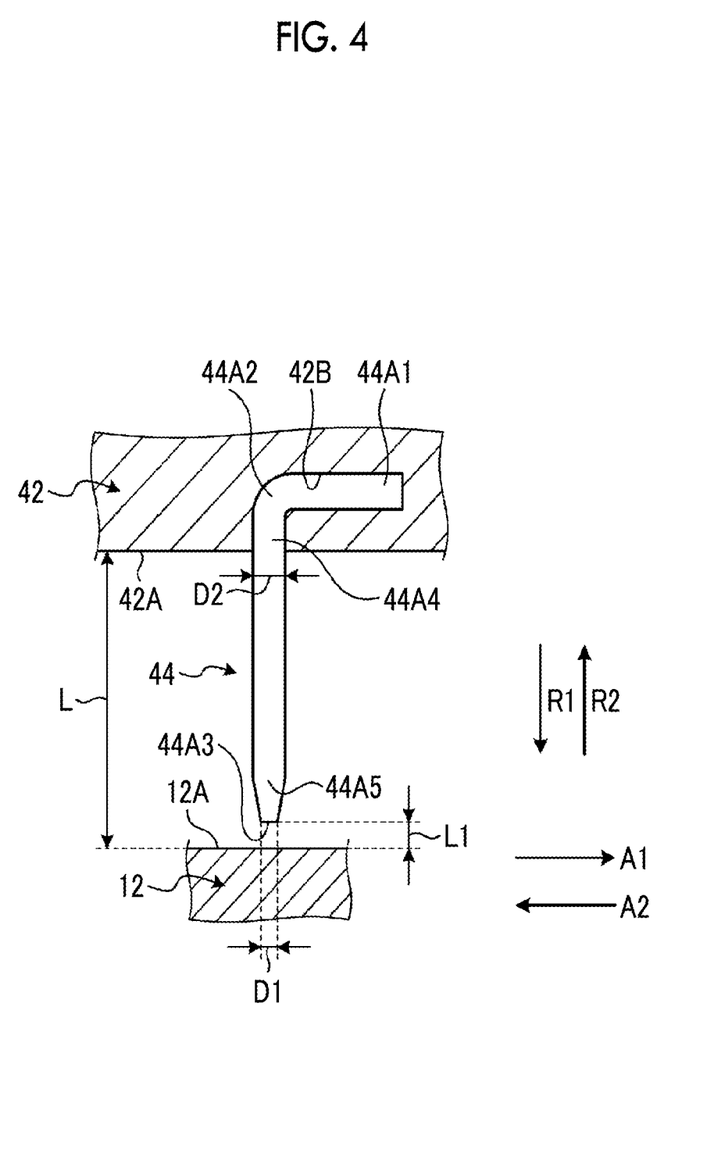
FIG. 4 is a schematic enlarged view of a first fin according to the present embodiment.

FIG. 4 is a schematic enlarged view of the first fin according to the present embodiment. As illustrated in FIG. 4, the first fin 44 is a separate body from a fixing object (here, the seal ring 42). A portion thereof is embedded in the seal ring 42, and the other portion protrudes in the direction R1 (facing surface side) from the tip surface 42A of the seal ring 42. That is, the first fin 44 is an attachment type fin. Specifically, the first fin 44 extends from a base end portion 44A1 which is one end portion to an intermediate portion 44A2 in the direction A2, and has a shape bent to the side in the direction R1 in the intermediate portion 44A2. The first fin 44 extends in the direction R1 from the intermediate portion 44A2 to a tip portion 44A3 which is the other end portion. The first fin 44 is inserted into a groove 42B formed in the seal ring 42 from the base end portion 44A1 to a root portion 44A4 which is a location between the intermediate portion 44A2 and the tip portion 44A3. The groove 42B and the first fin 44 are fixed by caulking. The first fin 44 is exposed from the tip surface 42A of the seal ring 42 in the root portion 44A4, and protrudes in the direction R1 from the tip surface 42A of the seal ring 42, from the root portion 44A4 to the tip portion 44A3. That is, the first fin 44 is a portion implanted in the seal ring 42 from the base end portion 44A1 to the root portion 44A4, and a portion from the root portion 44A4 to the tip portion 44A3 is a portion protruding from the seal ring 42. The first fin 44 has a fin shape extending in the rotation direction (circumferential direction) of the rotor 12.

When a portion between the root portion 44A4 and the tip portion 44A3 of the first fin 44 is defined as an intermediate portion 44A5, the first fin 44 has a constant width (length) in the rotation axis direction A from the root portion 44A4 to the intermediate portion 44A5, and the width in the rotation axis direction A decreases toward the tip portion 44A3 from the intermediate portion 44A5. Therefore, a width (length) D1 in the rotation axis direction A in the tip portion 44A3 of the first fin 44 is smaller than a width (length) D2 in the rotation axis direction A in the root portion 44A4 of the first fin 44. However, a shape of the first fin 44 is not limited thereto. For example, the first fin 44 may have a constant width in the rotation axis direction A from the root portion 44A4 to the tip portion 44A3. For example, the first fin 44 may not have the shape bent in the intermediate portion 44A2.

A distance between the tip portion 44A3 of the first fin 44 and a facing side surface (here, the outer peripheral surface 12A of the rotor 12) is defined as the clearance L1, and a distance between the tip surface 42A of the seal ring 42 and the outer peripheral surface 12A of the rotor 12 is defined as a clearance L between the seal ring 42 and the rotor 12.

Figure 5:
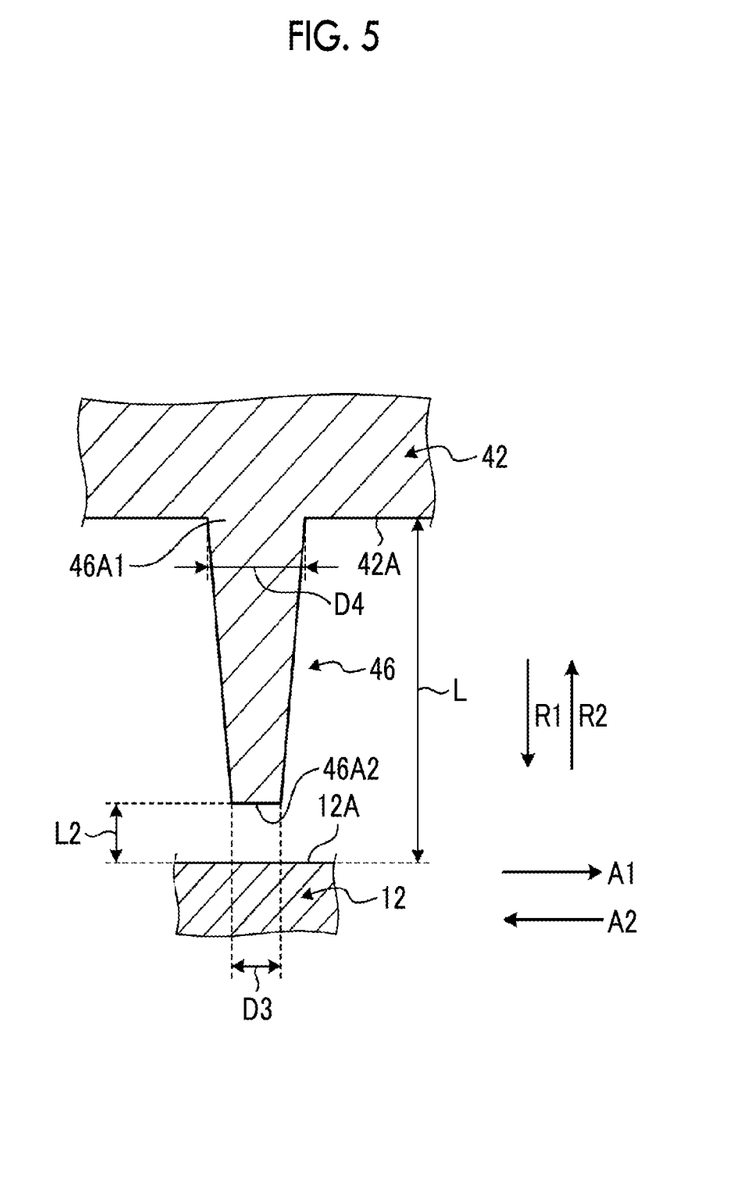
FIG. 5 is a schematic enlarged view of a second fin according to the present embodiment.

FIG. 5 is a schematic enlarged view of the second fin according to the present embodiment. As illustrated in FIG. 5, the second fin 46 is a fixed type fin integrated with a fixing object (here, the seal ring 42). For example, in the present embodiment, the seal ring 42 and the second fin 46 are formed by being cut from a base material, and thus, the second fin 46 is a machined fin. In the second fin 46, a base end portion 46A1 which is one end portion is connected to the tip surface 42A of the seal ring 42, and the second fin 46 extends in the direction R1 from the base end portion 46A1 to a tip portion 46A2 which is the other end portion. The second fin 46 has a fin shape extending in the rotation direction (circumferential direction) of the rotor 12.

The width of the second fin 46 in the rotation axis direction A decreases toward the tip portion 46A2 from the base end portion 46A1. Therefore, a width D3 in the rotation axis direction A in the tip portion 46A2 of the second fin 46 is smaller than a width D4 in the rotation axis direction A in the base end portion 46A1 of the second fin 46. However, a shape of the second fin 46 is not limited thereto. For example, the second fin 46 in the rotation axis direction A from the base end portion 46A1 to the tip portion 46A2 may have a constant width. For example, the base end portion 46A1 may have an R-shape.

A distance between the tip portion 46A2 of the second fin 46 and the facing side surface (here, the outer peripheral surface 12A of the rotor 12) is defined as the clearance L2.

The second fin 46 has a larger width in the rotation axis direction A than that of the first fin 44. Specifically, the width D3 in the tip portion 46A2 of the second fin 46 is larger than the width D1 in the tip portion 44A3 of the first fin 44. In addition, the width D4 in the base end portion 46A1 of the second fin 46 is larger than the width D2 in the root portion 44A4 of the first fin 44. The second fin 46 has the larger width in the rotation axis direction A than that of the first fin 44 in this way. Accordingly, strength of the second fin 46 is higher than that of the first fin 44. In addition, the second fin 46 may be formed of a material having higher strength than that of the first fin 44.

Next, positions where the first fin 44 and the second fin 46 are provided will be described. As illustrated in FIG. 3, in the segment S in which the first seal portion 40A is provided, the first fin 44 and the second fin 46 are aligned in the rotation axis direction A. In the segment S in which the first seal portion 40A is provided, the second fin 46 is provided on the side in the direction A2 from the first fin 44, that is, on a low-pressure side. More specifically, in the segment S in which the first seal portion 40A is provided, the first fin 44 is not provided on the side in the direction A2 from the second fin 46. In other words, the second fin 46 is disposed on the side in the direction A2 from all of the first fins 44 in the rotation axis direction A. In an example in FIG. 3, in the segment S in which the first seal portion 40A is provided, the plurality of (five in the example in FIG. 3) first fins 44 are aligned on the side in the direction A1, and the plurality of (two in the example in FIG. 3) second fins 46 are aligned on the side in the direction A2 from the first fins 44. In the segment S in which the first seal portion 40A is provided, it is preferable that the second fin 46 is provided on the side in the direction A2 from a central position of the segment S in the rotation axis direction A. The central position of the segment S in the rotation axis direction A is a midpoint in the rotation axis direction A between an end portion on the side in the direction A1 and an end portion on the side in the direction A2 of the segment S. In addition, in the segment S in which the first seal portion 40A is provided, it is preferable that the number of the second fins 46 is smaller than the number of the first fins 44. However, the number of the first fins 44 and the second fins 46 is selected in any desired way. For example, in the segment S in which the first seal portion 40A is provided, there may be one first fin 44, or there may be one second fin 46. Alternatively, the number of the second fins 46 may be larger than the number of the first fins 44.

As illustrated in FIG. 3, the third fin 48 is fixed to the other surface of the seal ring 42 and the rotor 12 which face each other. In the present embodiment, the third fin 48 is provided on the outer peripheral surface 12A of the rotor 12, and is fixed to the outer peripheral surface 12A. In the segment S in which the first seal portion 40A is provided, the third fins 48 are aligned in the rotation axis direction A on the outer peripheral surface 12A of the rotor 12.

Figure 6:
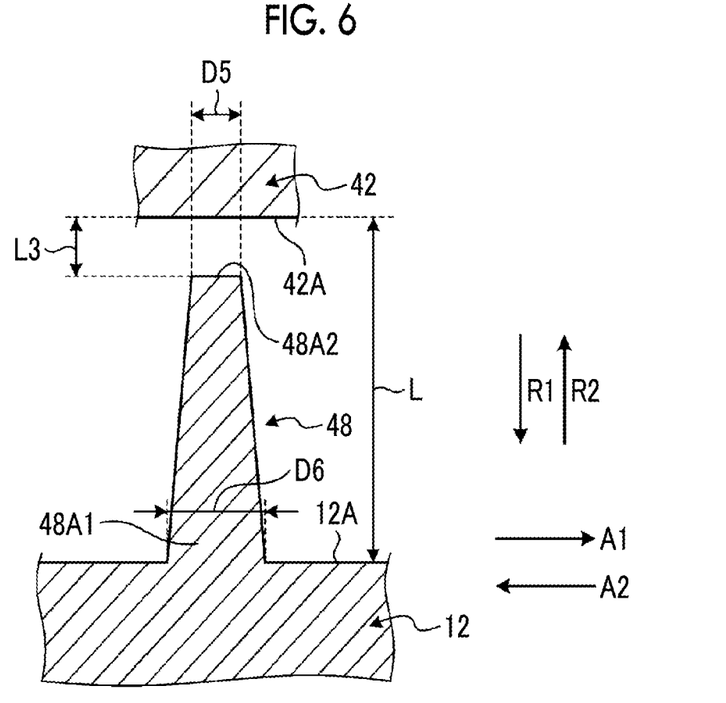
FIG. 6 is a schematic enlarged view of a third fin according to the present embodiment.

FIG. 6 is a schematic enlarged view of the third fin according to the present embodiment. As illustrated in FIG. 6, the third fin 48 is a fixed type fin integrated with a fixing object (here, the rotor 12). For example, in the present embodiment, the rotor 12 and the third fin 48 are formed by being cut from a base material, and thus, the third fin 48 is a machined fin. In the third fin 48, a base end portion 48A1 which is one end portion is connected to the outer peripheral surface 12A of the rotor 12, and the third fin 48 extends in the direction R2 from the base end portion 48A1 to a tip portion 48A2 which is the other end portion. The third fin 48 has a fin shape extending in the rotation direction (circumferential direction) of the rotor 12.

The width of the third fin 48 in the rotation axis direction A decreases toward the tip portion 48A2 from the base end portion 48A1. Therefore, a width D5 in the rotation axis direction A in the tip portion 48A2 of the third fin 48 is smaller than a width D6 in the rotation axis direction A in the base end portion 48A1 of the third fin 48. However, a shape of the third fin 48 is not limited thereto. For example, the third fin 48 may have a constant width in the rotation axis direction A from the base end portion 48A1 to the tip portion 48A2, or the base end portion 48A1 may have an R-shape, for example.

A distance between the tip portion 48A2 of the third fin 48 and the facing side surface (here, the tip surface 42A of the seal ring 42) is defined as the clearance L3.

In the present embodiment, the width D5 of the third fin 48 is larger than the width D1 of the first fin 44 and the width D3 of the second fin 46, and the width D6 of the third fin 48 is larger than the width D2 of the first fin 44 and the width D4 of the second fin 46. However, a size of the width of the third fin 48 is not limited thereto. The widths D5 and D6 may respectively be the same as the widths D3 and D4 of the second fin 46, or may respectively be smaller than the widths D3 and D4.

In this way, in the first seal portion 40A, the first fin 44 and the second fin 46 which have different widths in the rotation axis direction A are provided in one (here, the seal ring 42) of the seal ring 42 and the rotor 12 which face each other. The third fins 48 having the same width as each other in the rotation axis direction A are provided in the other (here, the rotor 12) of the seal ring 42 and the rotor 12 which face each other. That is, only the third fin 48 among the first fin 44, the second fin 46, and the third fin 48 is provided in the other of the seal ring 42 and the rotor 12 which face each other, here, the rotor 12. In addition, in the segment S in which the first seal portion 40A is provided, the first fin 44 and the third fin 48 are alternately provided in the rotation axis direction A, and both the second fin 46 and the third fin 48 are alternately provided in the rotation axis direction A. When the widths of the third fins 48 provided in the rotor 12 are the same as each other, without being limited to the fixed type fin integrated with a fixing object, the third fin 48 may be the attachment type fin separate from the fixing object.

Next, a configuration of the second seal portion 40B will be described. In the first seal portion 40A, the first fin 44 and the second fin 46 which have different widths are mixed on one surface of the seal ring 42 and the rotor 12 which face each other. However, the second seal portion 40B is not configured so that the first fin 44 and the second fin 46 are mixed on one surface. Specifically, as illustrated in FIG. 3, the second seal portion 40B includes the segment S (the seal ring 42 and a portion of the rotor 12 which faces the seal ring 42 in the radial direction R), the first fin 44, and the third fin 48. In the present embodiment, in the segment S in which the first seal portion 40A is provided, the seal ring 42 is an auxiliary fixed-side member disposed to be aligned with the seal ring 42 of in the segment S in which the second seal portion 40B is provided. The portion of the rotor 12 which faces the seal ring 42 in the radial direction R is an auxiliary rotary-side member disposed at a position facing the seal ring 42 (auxiliary fixed-side member). However, for example, the auxiliary rotary-side member separate from the rotor 12 may be fixed to the outer peripheral surface 12A of the rotor 12, and the auxiliary rotary-side member and the seal ring 42 may configure the segment S.

In the second seal portion 40B, the first fin 44 is provided on one surface of the seal ring 42 and the rotor 12 which face each other, here, the tip surface 42A of the seal ring 42. In the segment S in which the second seal portion 40B is provided, the first fin 44 is aligned in the rotation axis direction A on the tip surface 42A of the seal ring 42. In addition, in the second seal portion 40B, the third fin 48 is provided on the other surface of the seal ring 42 and the rotor 12 which face each other, here, on the outer peripheral surface 12A of the rotor 12. In the segment S in which the second seal portion 40B is provided, the third fin 48 is aligned in the rotation axis direction A on the outer peripheral surface 12A of the rotor 12. In the segment S in which the second seal portion 40B is provided, the first fin 44 and the third fin 48 are alternately provided in the rotation axis direction A.

In this way, in the second seal portion 40B, the first fin 44 is provided in the seal ring 42, and the third fin 48 is provided in the rotor 12. However, the fin provided in the seal ring 42 and the rotor 12 is not limited thereto. In the second seal portion 40B, one type of the fins having the same width in the rotation axis direction A may be provided in one of the seal ring 42 and the rotor 12 which face each other. One type of the fins having the same width in the rotation axis direction A may be provided on the other of the seal ring 42 and the rotor 12 which face each other.

The seal member 30 according to the present embodiment is configured as described above. Next, an operation of the seal member 30 will be described. In the turbine, when the clearance between the stator 11 and the rotor 12 which face each other decreases, a leakage of the fluid F decreases. Accordingly, output efficiency increases. In the present embodiment, the clearance between the stator 11 and the rotor 12 in the space SP1 and the space SP2 decreases, the leakage of the fluid F from the space SP1 to the space SP2 decreases, and the output efficiency of the turbine increases. In the seal member 30 according to the present embodiment, the fins (first fin 44, second fin 46, and third fin 48) decrease the clearance between the stator 11 and the rotor 12. In this manner, the leakage of the fluid F is decreased, and the output efficiency is increased.

Furthermore, in the turbine, as the length (width) of the fin in the rotation axis direction A decreases, the leakage of the fluid F decreases, and the output efficiency can increase. In addition, as the width of the fin in the rotation axis direction A decreases, the number of installable fins can be increased, and the efficiency can be further improved. On the other hand, in the segment S, a load is applied to the fin by a differential pressure acting between the high-pressure space SP1 and the low-pressure space SP2. However, as the length (width) in the rotation axis direction A decreases, strength of the fin is decreased. That is, the fin provided in the seal member 30 preferably has a small width from the viewpoint of efficiency. However, it shows a trade-off relationship since the fin preferably has a large width from the viewpoint of strength. On the other hand, in the seal member 30 according to the present embodiment, in the first seal portion 40A, the first fin 44 having the small width and the second fin 46 having the large width are provided on one surface of the seal ring 42 and the rotor 12. The second fin 46 is provided on the side (low-pressure side) in the direction A2 from the first fin 44. That is, the present embodiment pays attention to the fact that the differential pressure acting on the fin on the low-pressure side increases. Accordingly, the second fin 46 having the larger width is provided on the side in the direction A2 in which the differential pressure increases. In this manner, the strength of the fins at the location where the differential pressure increases is highly improved, and damage caused by an external force is prevented. Furthermore, the first fin 44 having the small width is provided on the side in the direction A1 in which the strength does not need to be increased that much since the differential pressure is small. In this manner, while the strength is maintained and the damage is prevented, the output efficiency can be improved. In the present embodiment, the first fin 44 and the second fin 46 are provided in this way. Accordingly, it is possible to improve both the output efficiency and the strength.

Figure 7:
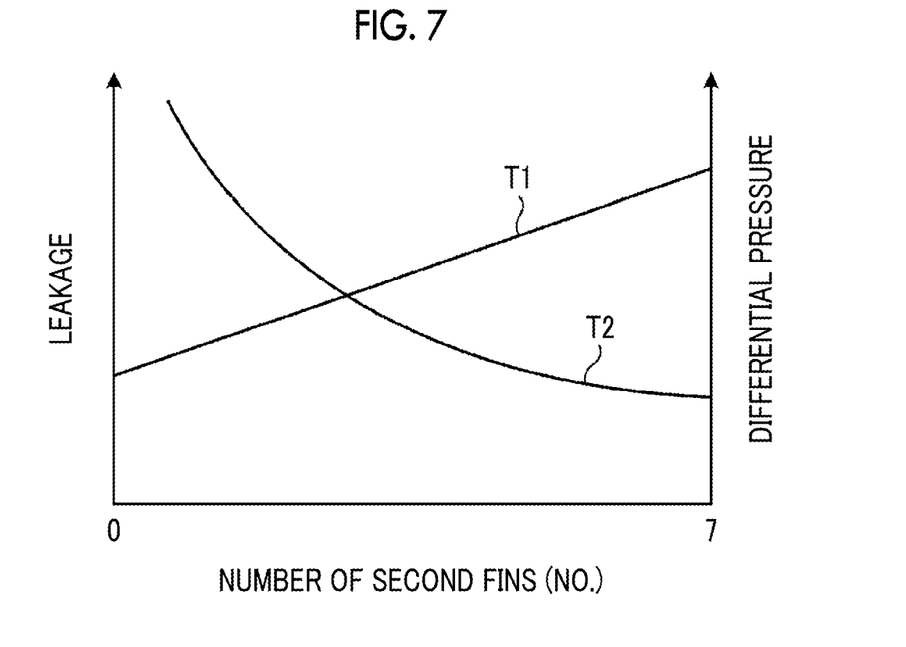
FIG. 7 is a graph illustrating a relationship among the number of the second fins, a leakage of a fluid, and a differential pressure acting on the first fin.

FIG. 7 is a graph illustrating a relationship among the number of the second fins, the leakage of the fluid, and the differential pressure acting on the first fin. FIG. 7 illustrates an example of a result obtained by analyzing and calculating the leakage of the fluid F leaking from the first seal portion 40A and the differential pressure acting on the first fin 44 when the number of the second fins 46 is changed in the first seal portion 40A. A line segment T1 in FIG. 7 illustrates a relationship between the number of the second fins 46 and the leakage of the fluid F. As illustrated in the line segment T1, the leakage of the fluid F increases as the number of the second fins 46 increases. That is, it can be understood as follows. As the number of the second fins 46 decreases and the number of the first fins 44 increases, the leakage decreases and the output efficiency increases. On the other hand, a line segment T2 in FIG. 7 illustrates a relationship between the number of the second fins 46 and the differential pressure acting on the first fin 44. As illustrated in the line segment T2, the differential pressure acting on the first fin 44 decreases as the number of the second fins 46 increases. That is, as the number of the second fins 46 increases and the number of the first fins 44 decreases, the first fins 44 are disposed on the low-pressure side. Accordingly, it can be understood as follows. The differential pressure acting on the first fins 44 decreases and a damage risk decreases. In addition, as illustrated by the line segment T1, the leakage of the fluid F is linearly changed with respect to the number of the second fins 46. On the other hand, as illustrated by the line segment T2, the differential pressure acting on the first fin 44 is changed in a curved line with respect to the number of the second fins 46. As a region has a larger number of the second fins 46, the amount of change in the differential pressure acting on the first fin 44 with respect to a change in the number of the second fins 46 decreases. Therefore, the number of the second fins 46 does not need to be increased that much with respect to the number of the first fins 44. For example, it is preferable that the number of the second fins 46 in the first seal portion 40A is smaller than the number of the first fins 44 in the first seal portion 40A. In addition, the number of the second fins 46 in one of the first seal portions 40A is one or more, and is preferably less than half of the total number of the first fins 44 and the second fins 46 in one of the first seal portions 40A.

Figure 8:
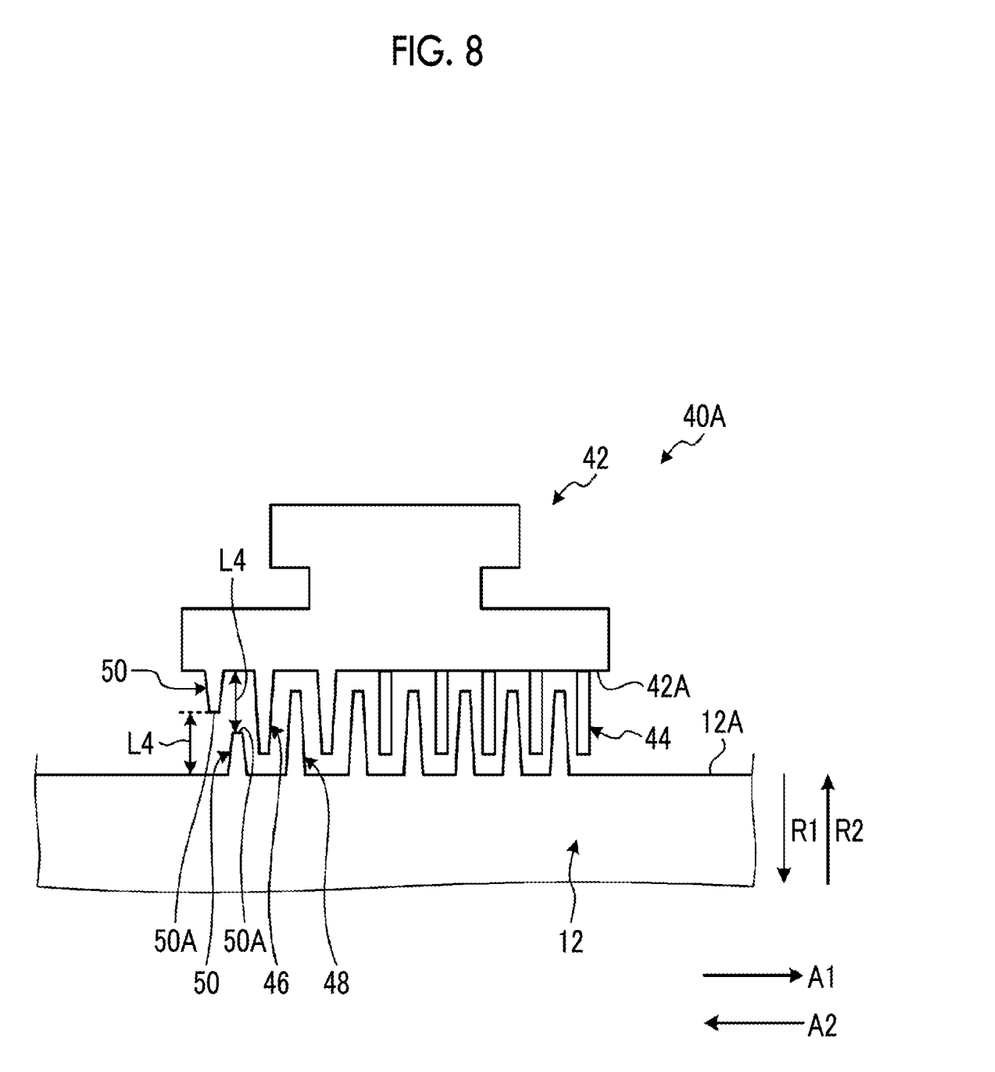
FIG. 8 is a schematic view illustrating another example of a first seal portion according to the present embodiment.

Next, another example of the seal member 30 will be described. FIG. 8 is a schematic view illustrating another example of the first seal portion according to the present embodiment. As illustrated in FIG. 8, in the first seal portion 40A, a protrusion portion 50 may be provided on the side in the direction A2 from the second fin 46. The protrusion portion 50 is provided on one surface (here, the tip surface 42A of the seal ring 42) and the other surface (here, the outer peripheral surface 12A of the rotor 12) of the seal ring 42 and the rotor 12 which face each other, and is provided on the side in the direction A2 from the second fin 46. The protrusion portion 50 provided on the tip surface 42A of the seal ring 42 protrudes from the tip surface 42A to the side in the direction R1, that is, to the rotor 12 side. The protrusion portion 50 provided on the outer peripheral surface 12A of the rotor 12 protrudes from the outer peripheral surface 12A to the side in the direction R2, that is, to the seal ring 42 side.

In the protrusion portion 50, a clearance L4 which is a distance between the tip surface 50A and the facing surface is smaller than the clearances L1, L2, and L3 of the first fin 44, the second fin 46, and the third fin 48. That is, in the protrusion portion 50, a function of decreasing the leakage of the fluid F and increasing the output efficiency is lower than that of the first fin 44, the second fin 46, and the third fin 48. The number of the protrusion portions 50 is not limited to one on each surface, and a plurality of the protrusion portions 50 may be provided on one surface. In addition, the protrusion portion 50 may be provided in only any one of the seal ring 42 and the rotor 12 which face each other.

Figure 9:
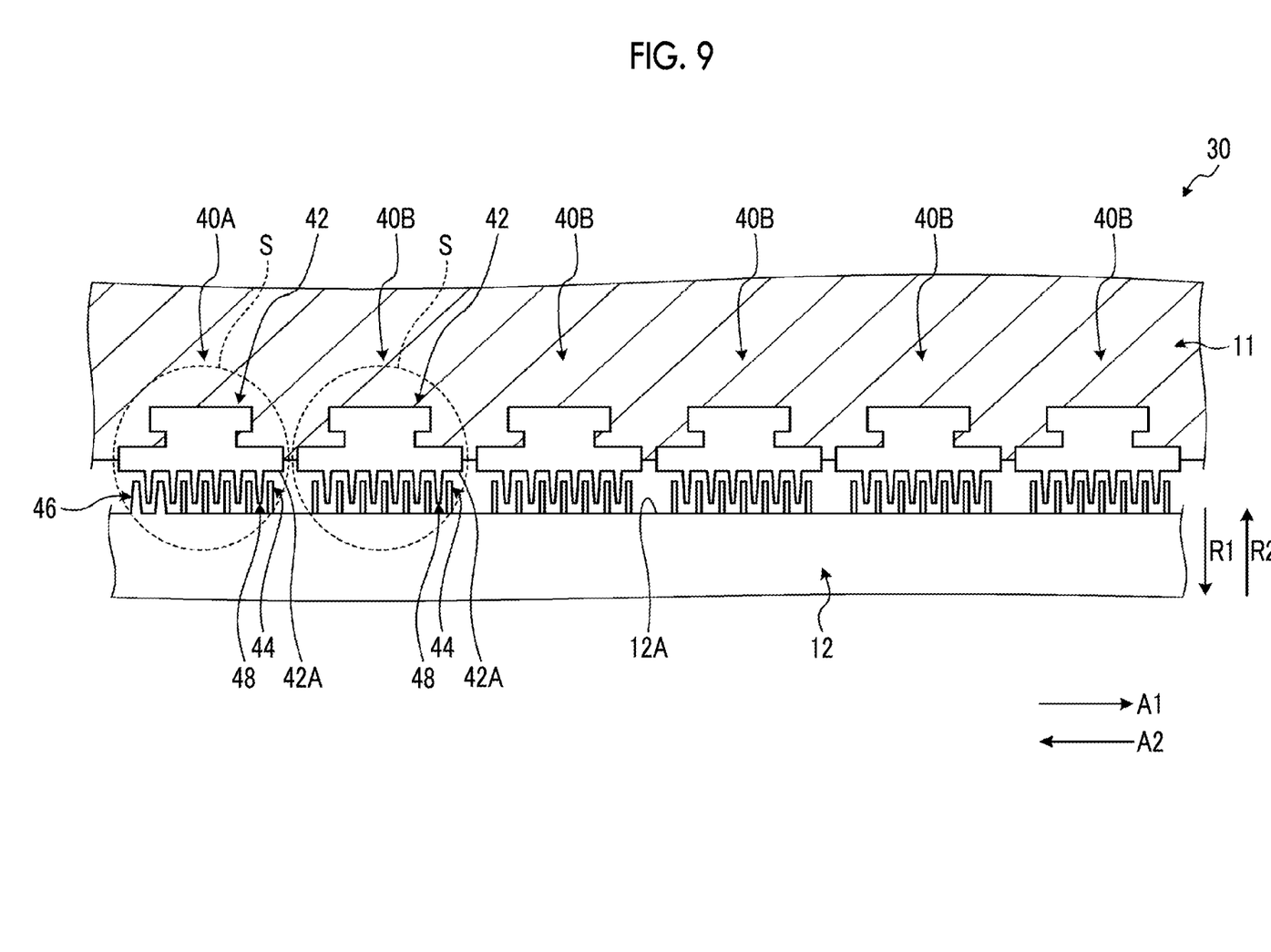
FIG. 9 is a schematic view illustrating another example of the seal member according to the present embodiment.
Figure 10:
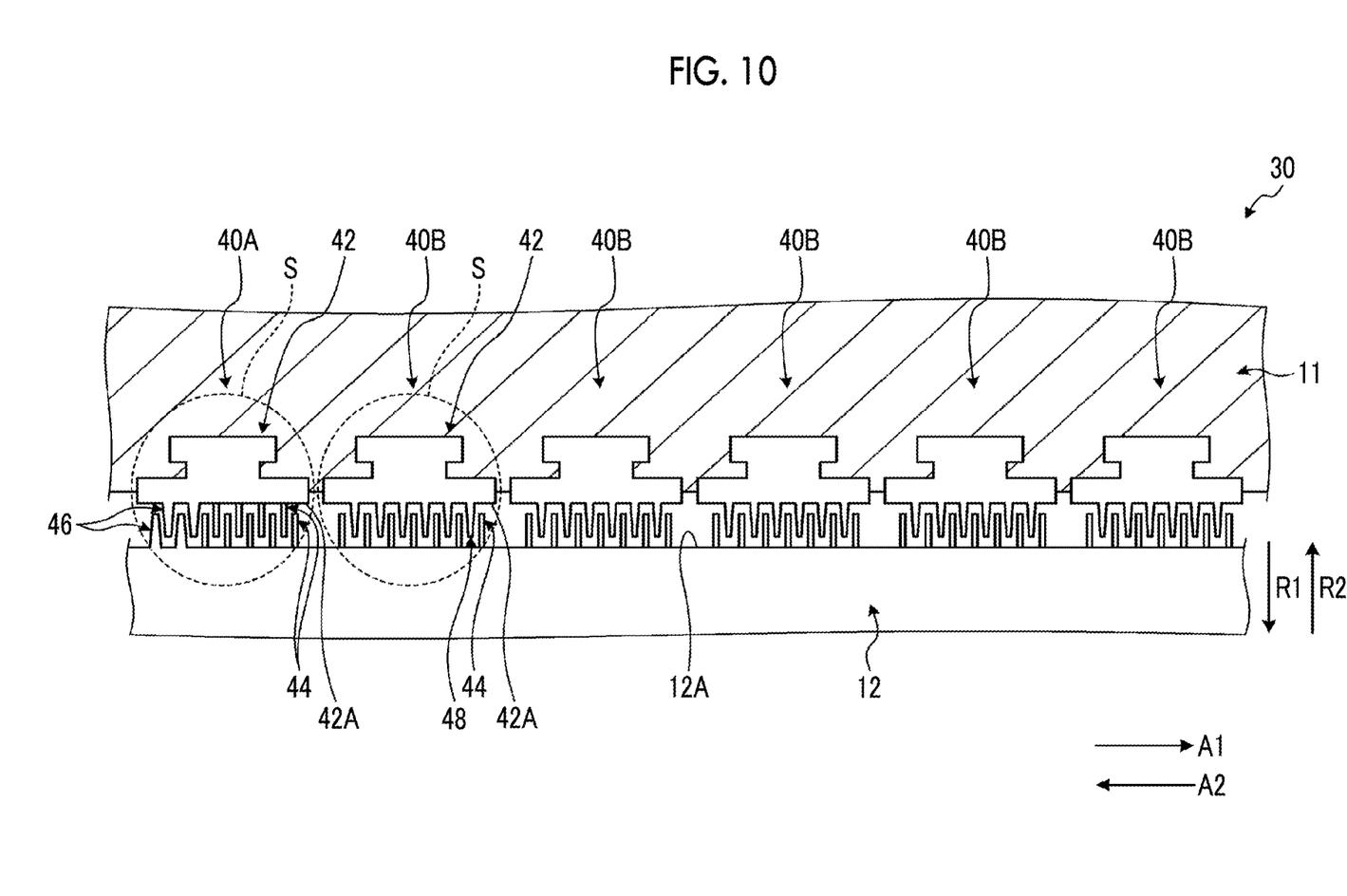
FIG. 10 is a schematic view illustrating another example of the seal member according to the present embodiment.

FIGS. 9 and 10 are schematic views illustrating another example of the seal member according to the present embodiment. In the present embodiment, the first fin 44 and the second fin 46 are provided in one of the seal ring 42 and the rotor 12 which face each other, that is, in the seal ring 42. However, as illustrated in FIGS. 9 and 10, the first fin 44 and the second fin 46 may be provided in the other of the seal ring 42 and the rotor 12, that is, in the rotor 12.

In the example in FIG. 9, in the first seal portion 40A, the first fin 44 and the second fin 46 are provided on the outer peripheral surface 12A of the rotor 12, and the third fin 48 is provided on the tip surface 42A of the seal ring 42. In the configuration in FIG. 9, the second fin 46 is also provided on the side in the direction A2, and the first fin 44 is also provided on the side in the direction A1. Accordingly, while the leakage of the fluid F is prevented, it is possible to prevent a decrease in the strength. When the first fin 44 and the second fin 46 are provided in the rotor 12 as illustrated in FIG. 9, a width D5 of the third fin 48 on the seal ring 42 side may be smaller than a width D3 of the second fin 46 on the rotor 12 side. A width D6 of the third fin 48 may be smaller than a width D5 of the second fin 46. In the seal ring 42, the width of the fin when the fin is manufactured by cutting can be easily decreased. Accordingly, the width of the third fin 48 can be decreased. In addition, in the example in FIG. 9, in the second seal portion 40B, the third fin 48 is provided in the seal ring 42, and the first fin 44 is provided in the rotor 12. However, without being limited thereto, one type of the fins having the same width in the rotation axis direction A may be provided on each surface.

In the example in FIG. 10, in the first seal portion 40A, the first fin 44 and the second fin 46 are provided on both the outer peripheral surface 12A of the rotor 12 and the tip surface 42A of the seal ring 42. In the configuration of FIG. 10, the second fin 46 is also provided on the side in the direction A2, and the first fin 44 is provided on the side in the direction A1. Accordingly, while the leakage of the fluid F is prevented, it is possible to prevent a decrease in the strength.

As described above, the seal member 30 according to the present embodiment is disposed between the rotor 12 and the stator 11, and seals a portion between the rotor 12 and the stator 11. The seal member 30 includes the rotor 12 (rotary-side member), the seal ring 42 (fixed-side member), the first fin 44, and the second fin 46. The rotor 12 is fixed to the facing surface (outer peripheral surface 12A) of the rotor 12 which faces the stator 11. The seal ring 42 is fixed to the stator 11, and faces the rotor 12. The first fin 44 is provided in any one of the rotor 12 and the seal ring 42, protrudes to the facing surface, and is disposed in the rotation axis direction A. The second fin 46 is disposed on the low-pressure side (side in the direction A2) of the rotation axis direction A from the first fin 44, protrudes to the facing surface side, and is disposed in the rotation axis direction A. The thickness (width D4) of the root (base end portion 46A1) of the second fin 46 in the rotation axis direction A is thicker than the thickness (width D2) of the root portion 44A4 of the first fin 44 in the rotation axis direction A. In the seal member 30 according to the present embodiment, the second fin 46 having the wide width is provided on the lower-pressure side in the direction A2 from the first fin 44. Accordingly, while the leakage of the fluid F is prevented, it is possible to prevent a decrease in the strength.

In addition, the tip thickness (width D3) of the second fin 46 in the rotation axis direction A is wider than the tip thickness (width D1) of the first fin 44 in the rotation axis direction A. In the seal member 30 according to the present embodiment, the second fin 46 having the wide width is provided on the lower-pressure side in the direction A2 from the first fin 44. Accordingly, while the leakage of the fluid F is prevented, it is possible to prevent a decrease in the strength.

In addition, the second fin 46 may be formed of a material having higher strength than that of the first fin 44. The second fin 46 is formed of a material having higher strength than that of the first fin 44. Accordingly, it is possible to more properly increase the strength of the fin on the side in the direction A2 in which the differential pressure increases.

In addition, the first fin 44 is an attachment type fin separate from the installed member (seal ring 42 or rotor 12), and the second fin 46 is a fixed type fin integrated with the installed member (seal ring 42 or rotor 12). The attachment type fin is used as the first fin 44. Accordingly, the width of the first fin 44 can be formed to be thin. The fixed type fin is used as the second fin 46. Accordingly, rigidity of the second fin 46 can be increased. Therefore, according to the seal member 30, while the leakage of the fluid F is prevented, it is possible to prevent a decrease in the strength.

However, when the width of the second fin 46 in the rotation axis direction A is larger than the width of the first fin 44 in the rotation axis direction A, the second fin 46 is not limited to the attachment type fin, and the first fin 44 is not limited to the fixed type fin. For example, the second fin 46 may be the fixed type fin, or the first fin 44 may be the attachment type fin.

In addition, in the rotation axis direction A, the second fin 46 is disposed on the low-pressure side (side in the direction A2) from the central position in the rotation axis direction A of the segment S (rotary-side member or fixed-side member). The second fin 46 is disposed on the side in the direction A2 from the center. In this manner, while a location where the differential pressure increases is reinforced by the second fin 46, the leakage of the fluid F can properly be prevented by the first fin 44.

In addition, in the rotation axis direction A, the second fin 46 is disposed on the low-pressure side (side in the direction A2) from all of the first fins 44. The second fin 46 is disposed on the side in the direction A2 from all of the first fins 44. In this manner, while the location where the differential pressure increases is reinforced by the second fin 46, the leakage of the fluid F can properly be prevented by the first fin 44.

In addition, the seal member 30 further has at least one auxiliary fixed-side member (seal ring 42 of the second seal portion 40B) disposed to be aligned with the fixed-side member (seal ring 42 of the first seal portion 40A) and provided with the fin protruding to the facing surface side, and an auxiliary rotary-side member (rotor 12 of the second seal portion 40B) disposed at a position facing the auxiliary fixed-side member of the rotor 12 and provided with the fin protruding to the facing surface side. In this way, the seal member 30 has the first seal portion 40A including the fixed-side member and the rotary-side member, and the second seal portion 40B including the auxiliary fixed-side member and the auxiliary rotary-side member. Accordingly, while the seal member 30 prevents the leakage of the fluid F, the seal member 30 can prevent a decrease in the strength.

In addition, the auxiliary fixed-side member (seal ring 42 of the second seal portion 40B) is disposed on the high-pressure side in the rotation axis direction A from the fixed-side member (seal ring 42 of the first seal portion 40A). According to the seal member 30, while the seal member 30 prevents the leakage of the fluid F, the seal member 30 can prevent a decrease in the strength.

In addition, any one of the rotary-side member (rotor 12) and the fixed-side member (seal ring 42) may further have the protrusion portion 50 having a protrusion amount smaller than those of the first fin 44 and the second fin 46. While the seal member 30 prevents the leakage of the fluid F, the seal member 30 can prevent a decrease in the strength.

In the above-described embodiment, the seal member 30 is provided between the high-pressure steam turbine 120 and the medium-pressure steam turbine 130. However, the location where the seal member 30 is provided is not limited thereto. The seal member 30 may be provided in any one of the gas turbine 110, the high-pressure steam turbine 120, the medium-pressure steam turbine 130, and the low-pressure steam turbine 140, or may be provided between the turbines. In addition, the seal member 30 may be provided in a rotary machine other than the combined cycle plant 100. In addition, the seal member 30 may be provided between the rotor blade serving as the rotary-side member provided in the rotor and the seal ring serving as the fixed-side member facing the rotor blade in the radial direction R and provided in the stator. That is, the seal member 30 may be provided between the high-pressure space SP1 and the low-pressure space SP2 in the rotary machine.

Hitherto, the embodiments of the present invention have been described. However, the embodiments are not limited by contents of the embodiments. In addition, the above-described configuration elements include those which can be easily assumed by those skilled in the art, those which are substantially the same, and those which have a so-called equal range. Furthermore, the above-described configuration elements can appropriately be combined with each other. In addition, various omissions, replacements, or modifications of the configuration elements can be made within the scope not departing from the concept of the above-described embodiments.

REFERENCE SIGNS LIST 11 stator
12 rotor
13 stator blade
14 rotor blade
30 seal member
40A first seal portion
40B second seal portion
42 seal ring
44 first fin 46 second fin
48 third fin
120 high-pressure steam turbine
A rotation axis direction
F fluid
S segment

The invention claimed is:

1. A seal member disposed between a rotor and a stator to seal a portion between the rotor and the stator, comprising:
    a rotary-side member fixed to a facing surface of the rotor which faces the stator;
    a fixed-side member fixed to the stator to face the rotary-side member;
    a first fin provided in any one of the rotary-side member and the fixed-side member and protruding to a facing surface side; and
    a second fin disposed on a low-pressure side in a rotation axis direction from the first fin, and protruding to the facing surface side,
    wherein a thickness of the second fin at a root in the rotation axis direction is thicker than a thickness of the first fin at a root in the rotation axis direction,
    wherein the first fin is an attachment type fin separate from an installed member, and the second fin is a fixed type fin integrated with the installed member.

2. The seal member according to claim 1,
    wherein a tip thickness of the second fin in the rotation axis direction is thicker than a tip thickness of the first fin in the rotation axis direction.

3. The seal member according to claim 1,
    wherein the second fin is formed of a material having higher strength than that of the first fin.

4. The seal member according to claim 1,
    wherein in the rotation axis direction, the second fin is disposed on a low-pressure side from a central position in the rotation axis direction of the rotary-side member or the fixed-side member.

5. The seal member according to claim 1,
    wherein in the rotation axis direction, the second fin is disposed on a low-pressure side from all of the first fins.

6. The seal member according to claim 1, further comprising:
    at least one auxiliary fixed-side member fixed to the stator to be aligned with the fixed-side member, and provided with a fin protruding to the facing surface side; and
    an auxiliary rotary-side member fixed to the rotor at a position facing the auxiliary fixed-side member, and provided with a fin protruding to the facing surface side.

7. The seal member according to claim 6,
    wherein the auxiliary fixed-side member is disposed on a high-pressure side in the rotation axis direction from the fixed-side member.

8. The seal member according to claim 1,
    wherein any one of the rotary-side member and the fixed-side member further has a protrusion portion having a protrusion amount smaller than that of the first fin and the second fin.

9. A rotary machine comprising:
    the seal member according to claim 1;
    a rotor; and
    a stator.

* * * * *